(12) United States Patent
Zander et al.

(10) Patent No.: US 7,351,871 B2
(45) Date of Patent: Apr. 1, 2008

(54) PROCESSES FOR PRODUCING POLY-ALPHA-OLEFINS, AND POLY-ALPHA-OLEFINS PRODUCED THEREBY

(75) Inventors: Lars Zander, Duesseldorf (DE); Alfred Westfechtel, Hilden (DE); Elke Grundt, Duesseldorf (DE); Markus Dierker, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 687 days.

(21) Appl. No.: 10/493,171

(22) PCT Filed: Oct. 11, 2002

(86) PCT No.: PCT/EP02/11392

§ 371 (c)(1),
(2), (4) Date: Apr. 20, 2004

(87) PCT Pub. No.: WO03/035707

PCT Pub. Date: May 1, 2003

(65) Prior Publication Data

US 2004/0267073 A1 Dec. 30, 2004

(51) Int. Cl.
*C07C 1/20* (2006.01)
(52) U.S. Cl. .................. 585/639; 585/533; 585/640
(58) Field of Classification Search ............ 585/533, 585/640, 639
See application file for complete search history.

(56) References Cited

U.S. PATENT DOCUMENTS 4,365,057 A * 12/1982 Saito et al. ................. 528/503
4,962,252 A 10/1990 Wade
5,349,110 A 9/1994 Knifton
5,917,100 A 6/1999 Böhm et al.

FOREIGN PATENT DOCUMENTS

| EP | 0 321 852 B1 | 6/1989 |
|----|--------------|--------|
| EP | 0 401 776 B1 | 12/1990 |
| EP | 0 498 975 A1 | 8/1992 |
| EP | 0 607 773 B1 | 7/1994 |
| WO | WO 01/19873 A1 | 3/2001 |

OTHER PUBLICATIONS

Ballantine, James A. et al: "Chemical conversions using sheet silicates: novel intermolecular dehydrations of alcohols to ethers and polymers" Journal of the Chemical Society, Chemical Communications (1981), (9), 427-8, XP009004937.
Database CA 'Online! Chemical Abstracts Service, Columbus, Ohio, US; Dobryanskii, A. F. et al: "The dehydration of 2-ethylhexanol over an aluminum silicate catalyst" retrieved from STN Database accession No. 55:143389, XP002229141 abstract & Trudy Leningrad, Tekhnol. Inst. IM. Lensoveta (1959), (No. 51), 94-7.
Database CA 'Online! Chemical Abstracts Service, Columbus , Ohio, US; Reppe, Walter et al.: Ethynylation. V. Reactions of hydrated ethynylation products. Dehydration of gamma—alkanediols retrieved from STN Database accession No. 50:89209, XP002229142 abstract & ANN. (1955), 596, 80-158

* cited by examiner

*Primary Examiner*—Thuan Dinh Dang
(74) *Attorney, Agent, or Firm*—John F. Daniels; Jane E. Keene

(57) ABSTRACT

Process for producing poly-α-olefins are described wherein the processes comprise: (a) providing a primary alcohol; and (b) polymerizing the primary alcohol in the presence of an acidic alumino layer silicate to form a poly-α-olefin. Water formed during the polymerization can be removed, optionally during the polymerization, and subsequent hydrogenation may be performed.

18 Claims, No Drawings

PROCESSES FOR PRODUCING POLY-ALPHA-OLEFINS, AND POLY-ALPHA-OLEFINS PRODUCED THEREBY

BACKGROUND OF THE INVENTION

Poly-α-olefins have been known for some time. They are normally obtained by polymerization of α-olefins in the presence of catalysts. Typical catalysts are Lewis acids and transition metal compounds.

EP 321 852 B describes the production of 1-olefin polymer waxes by polymerization of 1-olefins under pressures of 0.5 to 120 bar in the presence of a catalyst consisting of a metallocene as transition metal compound and an aluminoxane as activator.

EP 401 776 B describes a process for the production of poly-1-olefins in which 1-olefins are polymerized in the presence of a catalyst consisting of the reaction product of a magnesium alcoholate with titanium tetrachloride and an organometallic compound of group I-III of the periodic system.

EP 607 773 B describes a process for the production of low molecular weight poly-1-olefins by homo- or copolymerization of a 1-olefin at temperatures in the range from 20 to 200° C. and under pressures of 0.5 to 50 bar in the presence of a special catalyst, the molecular weight of the polymer being adjusted with hydrogen so that low molecular weight poly-1-olefins with a viscosity number below 80 cm$^3$ g$^{-1}$ are formed.

WO 01/19873 A1 describes a process for the production of polyolefins in which a catalyst containing a stable BF$_3$ complex is added to a liquid raw material containing at least one olefin. The reaction is characterized by other features which are directed towards special apparatus parameters.

BRIEF SUMMARY OF THE INVENTION

The present invention relates, in general, to a process for the production of poly-α-olefins by dehydrating polymerization in the presence of acidic alumino layer silicates and, optionally, subsequent hydrogenation and to poly-α-olefins obtainable by polymerization of primary alcohols in the presence of acidic alumino layer silicates and, optionally, subsequent hydrogenation.

Although several processes for the production of poly-α-olefins are known from the prior art, there is still a constant need to provide processes by which poly-α-olefins can be obtained. There is also a need for new poly-α-olefins which cannot be obtained by conventional methods.

It has now surprisingly been found that poly-α-olefins and, more particularly, new poly-α-olefins with interesting properties, such as minimal vulnerability to oxidation and low viscosity, can be elegantly obtained by reaction of acidic alumino layer silicates with primary alcohols.

In a first embodiment, therefore, the present invention relates to a process for the production of poly-α-olefins which is characterized in that primary alcohols are subjected to dehydrating polymerization in the presence of acidic alumino layer silicates at temperatures in the range from 60 to 340° C. and optionally hydrogenated in a following step.

In a preferred embodiment of the invention, the water formed is removed during the reaction.

In another preferred embodiment, the reaction is carried out in an inert gas atmosphere, more particularly of nitrogen.

In another preferred embodiment, the reaction temperature is adjusted so that the system containing the desired olefin and the acidic alumino layer silicate is heated until the separation of water is observed and this temperature is maintained until there is no further elimination of water. The catalyst is then removed, for example by filtration, a clear liquid product being obtained. In this embodiment, too, the reaction is carried out in an inert gas atmosphere, preferably of nitrogen.

DETAILED DESCRIPTION OF THE INVENTION

Basically, the process according to the invention is not limited in any way in regard to the nature of the primary alcohols to be used. Alcohols containing at least one primary OH group and preferably one or two primary OH groups and, more particularly, 6 to 72 carbon atoms per molecule are preferably used. The alcohols may be used individually or in admixture with one another. The alcohols may be linear or branched, saturated or mono- or polyunsaturated, more particularly olefinically unsaturated.

In one embodiment of the present invention, the primary alcohols used are monofunctional compounds corresponding to formula (I):

$$R^1OH \quad\quad\quad (I)$$

where R$^1$ is an alkyl group containing 6 to 72 carbon atoms, which may be saturated or unsaturated, linear or branched. Examples of suitable primary monofunctional linear alcohols of formula (I) are hexanol, heptanol, octanol, nonanol, decanol, undecanol, dodecanol, tridecanol, tetradecanol, pentadecanol, hexadecanol, heptadecanol, octadecanol, nonadecanol, eicosanol, docosanol, tetracosanol, 10-undecen-1-ol, oleyl alcohol, elaidyl alcohol, ricinolyl alcohol, linoleyl alcohol, linolenyl alcohol, gadoleyl alcohol, arachidonyl alcohol, erucyl alcohol, brassidyl alcohol. Examples of suitable primary monofunctional branched alcohols of formula (I) are those containing at least one methyl branch in the alkyl group which may be at any position in the alkyl chain, as for example in isononyl alcohol, isostearyl alcohol or isotridecyl alcohol. Other suitable primary monofunctional branched alcohols are the Guerbet alcohols known to the expert which are obtainable by dimerization of fatty alcohols and which, structurally, are distinguished by the fact that they have a relatively long alkyl group preferably containing 2 to 18 carbon atoms in the α-position to the terminal CH$_2$OH group. Suitable Guerbet alcohols are 2-hexyldecanol, 2-butyloctanol, 2-octyldodecanol and 2-hexyldecyl palmitate/stearate, 2-ethylhexanol and 2-propylheptanol.

Preferred primary alcohols of formula (I) are monofunctional branched alcohols which preferably contain one or more methyl or C$_{2-18}$ alkyl groups as branches; the branches may be distributed over the entire alkyl chain of the alcohol. If the branch(es) is/are methyl groups, several and preferably 2 to 6 methyl groups may be distributed over the alkyl chain of the alcohol. If the branch is a C$_{2-18}$ alkyl group, there are preferably no other branches in the alkyl chain of the alcohol. Guerbet alcohols, preferably 2-ethylhexyl alcohol, are particularly suitable.

In another embodiment of the present invention, the alcohols used are primary difunctional alcohols (with 2 hydroxyl groups) which may be saturated or unsaturated, such as pentane-1,5-diol, octane-1,8-diol, hexane-1,6-diol, decane-1,10-diol, dodecane-1,12-diol or the dimer and/or trimer alcohols known to the expert. Dimerdiols/trimertriols are technical mixtures obtained by oligomerization of unsaturated fatty acids containing 12 to 22 and preferably 16 to 18 carbon atoms or methyl esters thereof and subsequent high-pressure hydrogenation. On average, two to three fatty acids come together in the oligomerization reaction and form dimers or trimers with predominantly aliphatic structures. The oligomerization may be carried out thermally or in the presence of noble metal catalysts. The reaction is preferably carried out in the presence of clays. Besides the fatty acids, esters, preferably methyl esters, thereof may also be dimerized. Dimerdiol/trimertriol mixtures which are particularly preferred for the purposes of the invention are obtained by oligomerization of technical oleic acid and subsequent high-pressure hydrogenation and have a dimerdiol content of 33 to 99% by weight and a trimertriol content of 1 to 67% by weight. Within the group of difunctional alcohols, the dimerdiols are particularly important because polyolefins with extremely interesting properties, for example high viscosity, can be produced with them.

Basically, the reaction times during the polymerization are moderate and are normally in the range from 2 to 48 hours. As already mentioned, the reaction is preferably carried out in an inert gas atmosphere and the water of reaction formed is continuously removed from the system. In this case, the end of the reaction is reached when there is no further elimination of water. In this way, it is possible to ensure that only the minimum necessary reaction time is adjusted so that the system is spared any further heat stress.

In the process according to the invention, the reaction is induced by acidic alumino layer silicates. The acid charge of the alumino layer silicates is preferably 3 to 300 mval/100 g. The process according to the invention has the advantage that the catalyst is only used in relatively small quantities and can largely be reused. Alumino layer silicates are minerals with a silicate basic structure in which layer silicates with partly incorporated aluminium$^{3+}$ ions, which are linked together by dipole/dipole interactions and hydrogen bridge bonds, are present, these two-dimensionally infinite anionic layer silicates being electrostatically crosslinked via cations of an interlayer. The structure and composition of such layer silicates are known to the expert from the prior art and are described in the relevant literature.

Examples of alumino layer silicates are talcum and clays with a sheet structure, such as kaolinite, montmorillonite, bentonites and hectorites.

Basically, the quantity of the acid-charged aluminium layer silicate is not critical. However, the catalyst is normally used in a quantity—based on the alcohol used—of 1 to 100% by weight in the process according to the invention. The preferred quantity is in the range from 1 to 10% by weight. In principle, there are no particular limitations to the type of acid used in the acid-charged alumino layer silicates. However, hydrohalic acids, more particularly HCl, and sulfuric acid and phosphoric acid are preferred.

Particularly preferred catalysts for the purposes of the invention are acid-charged montmorillonites. A preferred embodiment of the invention is characterized by the use of K catalysts with the acid charge described above. These catalysts are known to the expert and are commercially obtainable from Südchemie. According to the invention, the commercially available type K5 is particularly suitable. Quite generally, the K catalysts may be used individually or in combination with one another.

Suitable catalysts are, on the one hand, alumino layer silicates which already have the necessary critical acid charge in the above-mentioned range from their production, as is the case for example with K catalysts of the K5 type. However, equally suitable catalysts are alumino layer silicates which, initially, have a relatively low acid charge from their production, but which, subsequently, have been charged with so much acid that their acid charge is in the critical range mentioned above.

The alcohol is normally used in water-free form. However, technical-quality alcohols with a water content of up to ca. 2% by weight may also be used.

The degree of oligomerization of the poly-α-olefins obtainable by the process according to the invention is in the range from 1 to 10. The adjustment of a particular degree of oligomerization can be achieved by returning the olefin entrained during the removal of water to the reaction mixture. This is particularly important when relatively high degrees of oligomerization are to be adjusted.

In one embodiment of the present invention, the dehydrating polymerization may be followed by hydrogenation of the poly-α-olefins obtained (so-called hardening). The hydrogenation may be carried out in known manner at temperatures in the range from 150 to 250° C. and preferably at temperatures in the range from 190 to 210° C. and under pressures of 50 to 150 bar (low-pressure process) or 150 to 350 bar (high-pressure process). Suitable catalysts are the hydrogenation catalysts known from the prior art, such as nickel or the noble metal catalysts, more particularly based on palladium or platinum. Particularly suitable noble metal catalysts are palladium catalysts, more particularly palladium on coal. The catalyst may be added to the poly-α-olefins in typical quantities either in the form of a suspension or in solid form. For the preferred palladium on coal, the quantities used are in the range from 0.001 to 5% by weight, expressed as palladium. However, the catalyst may also be applied to a solid carrier material, such as active charcoal, graphite, kieselguhr, silica gel, spinels, aluminium oxide or ceramic materials. Other suitable catalysts are nickel catalysts, for example suspended nickel, such as Nysofact 101 I a (Engelhard), which is preferably used in quantities of 0.01 to 5% by weight, based on nickel.

By virtue of its flexibility, the process according to the invention of dehydrating polymerization and, optionally, subsequent hydrogenation also provides access to new poly-α-olefins based on unsaturated primary monofunctional alcohols, branched primary monofunctional alcohols and/or primary diols.

Accordingly, the present invention also relates to poly-α-olefins obtainable by subjecting unsaturated primary monofunctional alcohols to dehydrating polymerization in the presence of acidic alumino layer silicates at temperatures in the range from 60 to 340° C.

The present invention also relates to poly-α-olefins obtainable by subjecting branched primary monofunctional alcohols to dehydrating polymerization in the presence of acidic alumino layer silicates at temperatures in the range from 60 to 340° C. and optionally hydrogenating the product of this dehydrating polymerization in a following step.

The present invention also relates to poly-α-olefins obtainable by subjecting primary diols to dehydrating polymerization in the presence of acidic alumino layer silicates at temperatures in the range from 60 to 340° C. and optionally hydrogenating the product of this dehydrating polymerization in a following step.

Suitable process conditions for the polymerization and hydrogenation steps, including the catalysts, quantity ratios and the primary alcohols to be used, were discussed in the foregoing in connection with the process according to the invention.

There is no exact structural formula for the poly-α-olefins obtained because, under the dehydrating polymerization conditions, the primary alcohols in question are isomerized into various unsaturated monomers which then polymerize with one another.

The new poly-α-olefins are colorless or yellowish products which may be liquid or solid.

EXAMPLES

In the following Examples, the percentages by weight of the catalyst K5 (commercially obtainable from Südchemie/ DE) are based on the quantity of alcohol used. The following abbreviations are used in the analytical characterization of the products obtained: AV=acid value, IV=iodine value, OHV=hydroxyl value.

A) Preparation of the Poly-α-olefins

Example 1

250 g octanol were heated under nitrogen in the presence of 10% by weight of the catalyst K5 until the separation of water was observed. The reaction mixture was kept at that temperature until there was no further elimination of water. The reaction mixture was removed from the catalyst by filtration and gave a clear liquid product.

Example 2

500 g dodecanol were heated under nitrogen in the presence of 5% by weight of the catalyst K5 until the separation of water was observed. The reaction mixture was kept at that temperature until there was no further elimination of water. The reaction mixture was removed from the catalyst by filtration and gave a clear liquid product. Analysis: AV=0.3, IV=100.

Example 3

500 g Lorol spezial (Cognis Deutschland GmbH) were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a clear, yellowish liquid product. Analysis: AV=0.3, IV=94, OHV=0.4.

Example 4

500 g Ocenol 50/55 (Cognis Deutschland GmbH) were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a yellowish, solid product. Analysis: AV=0.2, IV=77, OHV=6.5.

Example 5

500 g isononyl alcohol were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a clear colorless product. Analysis: AV=0.1, IV=137, OHV=0.5.

Example 6

500 g hexane-1,6-diol were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a yellowish, pasty product. Analysis: AV=0.2, IV=34, OHV=61.

Example 7

500 g isotridecyl alcohol were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a clear, colorless product. Analysis: AV=0.1, IV=197, OHV=2.7.

Example 8

1,200 g 2-ethyl hexanol were heated under nitrogen in the presence of 5% by weight of the catalyst K5 until the separation of water was observed. The reaction mixture was kept at that temperature until there was no further elimination of water. The still hot reaction mixture was removed from the catalyst by filtration and gave a clear, colorless product. Analysis: AV=0.2, IV=217, OHV=0.4.

Example 9

2,800 g 2-octyl dodecanol were heated under nitrogen in the presence of 5% by weight of the catalyst K5 until the separation of water was observed. The reaction mixture was kept at that temperature until there was no further elimination of water. The still hot reaction mixture was removed from the catalyst by filtration. After the low-boiling constituents had been distilled off, a clear colorless product was obtained. Analysis: OHV=0.1, IV=127.

Example 10

2,800 g dimerdiol (Sovermol 908, a product of Cognis Deutschland GmbH & Co. KG) were heated under nitrogen in the presence of 5% by weight of the catalyst K5 until the separation of water was observed. The reaction mixture was kept at that temperature until there was no further elimination of water. The still hot reaction mixture was removed from the catalyst by filtration. After the low-boiling constituents had been distilled off, a clear colorless product was obtained. Analysis: OHV=14.6, AV=0.3, IV=100.

B) Examples for the Hydrogenation of the Poly-α-olefins

The percentages by weight for the hydrogenation catalyst are based on the quantity of palladium.

Example 11

560 g poly-α-olefin based on 2-ethylhexanol obtained from Example 8 and 0.05% by weight palladium on coal were treated with 100 bar hydrogen for 5 hours at 200° C. The catalyst was filtered off and the product deodorized. Analysis: OHV=0.1, IV=1.1, AV=0.1.

Example 12

1380 g poly-α-olefin based on octanol obtained from Example 1 and 0.05% by weight palladium on coal were treated with 100 bar hydrogen for 5 hours at 200° C. The catalyst was filtered off and the product deodorized.

Analysis: OHV=3.4, AV=0.2, IV=16.4.

Example 13

1380 g poly-α-olefin based on dimerdiol obtained from Example 10 and 0.05% by weight palladium on coal were treated with 100 bar hydrogen for 5 hours at 200° C. The catalyst was filtered off and the product deodorized. Analysis: OHV=1.2, IV=9.7.

Example 14

290 g poly-α-olefin based on hexane-1,6-diol obtained from Example 6 and 0.05% by weight palladium on coal were treated with 100 bar hydrogen for 5 hours at 200° C. The catalyst was filtered off and the product deodorized. Analysis: OHV=70, IV=11.4.

What is claimed is:

1. A process for producing poly-α-olefins, comprising:
   (a) providing a primary alcohol; and
   (b) polymerizing the primary alcohol in the presence of an acidic alumino layer silicate to form a poly-α-olefin, wherein the acidic alumino layer silicate has an acid charge of from 3 to 300 mval/100 g.

2. The process according to claim 1, wherein water formed during the polymerization is removed.

3. The process according to claim 2, wherein water formed during the polymerization is removed during the polymerization.

4. The process according to claim 1, wherein the polymerization is carried out at a temperature of from 60 to 340° C.

5. The process according to claim 1, wherein the primary alcohol comprises a primary monofunctional alcohol of the general formula (I):

$$R^1OH \quad (I)$$

wherein $R^1$ represents an alkyl group having from 6 to 72 carbon atoms.

6. The process according to claim 1, wherein the primary alcohol comprises a primary, branched, monofunctional alcohol.

7. The process according to claim 1, wherein the primary alcohol comprises 2-ethylhexyl alcohol.

8. The process according to claim 1, wherein the primary alcohol comprises a primary diol.

9. The process according to claim 1, wherein the primary alcohol comprises a primary dimerdiol.

10. The process according to claim 1, wherein the acidic alumino layer silicate comprises a component selected from the group consisting of talcums, kaolinites, montmorillonites, bentonites and hectorites.

11. The process according to claim 1, further comprising hydrogenating the poly-α-olefin.

12. The process according to claim 1, wherein the primary alcohol comprises an unsaturated alcohol.

13. The process according to claim 1, wherein the primary alcohol comprises a branched alcohol.

14. A process for producing poly-α-olefins, comprising:
    (a) providing a primary alcohol; and
    (b) polymerizing the primary alcohol in the presence of an acidic alumino layer silicate to form a poly-α-olefin, wherein the acidic alumino layer silicate comprises an HCl-charged alumino layer silicate.

15. The process according to claim 14, wherein water formed during the polymerization is removed.

16. The process according to claim 14, wherein water formed during the polymerization is removed during the polymerization.

17. The process according to claim 14, wherein the polymerization is carried out at a temperature of from 60 to 340° C.

18. The process according to claim 14, further comprising hydrogenating the poly-α-olefin.

* * * * *